United States Patent [19]
Rittler

[11] 4,455,160
[45] Jun. 19, 1984

[54] TRANSPARENT GLASS-CERAMICS ESPECIALLY SUITABLE FOR USE AS STOVE WINDOWS

[75] Inventor: Hermann L. Rittler, Corning, N.Y.

[73] Assignee: Corning Glass Works, Corning, N.Y.

[21] Appl. No.: 451,282

[22] Filed: Dec. 20, 1982

[51] Int. Cl.³ ............................................. C03C 21/00
[52] U.S. Cl. ................................. 65/30.13; 65/30.14
[58] Field of Search ............................. 65/30.13, 30.14

[56] References Cited
U.S. PATENT DOCUMENTS

| | | | |
|---|---|---|---|
| 3,406,279 | 10/1968 | Ziver | 65/30.14 X |
| 3,428,513 | 2/1969 | Denman | 65/30.14 X |
| 3,573,076 | 3/1971 | Rittler | 65/30.14 |
| 3,597,179 | 8/1971 | Simmons | 65/30.14 |

OTHER PUBLICATIONS
Karstetter et al., 50 J. Amer. Ceram. Soc. #3, pp. 133-137; 3-21-67.

*Primary Examiner*—Kenneth M. Schor
*Attorney, Agent, or Firm*—C. S. Janes, Jr.

[57] ABSTRACT

This invention is directed to a method for making transparent glass-ceramic articles containing β-quartz solid solution as the predominant crystal phase that are resistant to attack by the fumes generated in a coal or wood burning stove so as to render them particularly suitable for windows in such stoves. One embodiment of the inventive method comprises subjecting the precursor glass article to a H+ ion for Li+ ion exchange and subsequently heat treating the glass article to crystallize it to a glass-ceramic. A second embodiment of the inventive method comprises heat treating the precursor glass to crystallize it to a glass-ceramic and then subjecting the glass-ceramic article to a K+ ion for Li+ ion exchange.

4 Claims, No Drawings

TRANSPARENT GLASS-CERAMICS ESPECIALLY SUITABLE FOR USE AS STOVE WINDOWS

BACKGROUND OF THE INVENTION

Windows for use in the doors of cooking stoves and other relatively low temperature heating chambers have conventionally been shaped from standard soda lime glasses, or where somewhat higher temperature capability was believed necessary, from borosilicate glasses, e.g., PYREX brand products marketed by Corning Glass Works, Corning, N.Y. With the recent dramatic increase in the cost of heating oil and natural gas, there has been a great upsurge in the use of coal and wood stoves for heating rooms or entire homes and other relatively small buildings. Most generally, those stoves have a window in the door or other area to permit the user to observe the burning taking place inside.

Coal and wood stoves customarily operate at temperatures higher than those encountered in the traditional gas-fired or electric cooking stove, and the atmosphere generated therein through the combustion of coal and/or wood is normally more chemically corrosive than that produced in cooking food. Furthermore, because of the manner in which the coal and/or wood is charged into the stove and the possible subsequent movement thereof in the stove during burning, the viewing window may occasionally be exposed to impacts and other physical abuse.

Windows for use in those stoves have been fabricated from borosilicate glasses but such have been subject to cracking both from thermal and mechanical causes. Coal and wood stoves may reach temperatures in excess of 600° C. when in operation. The conventional borosilicate glass exhibits a strain point of about 510° C. and a coefficient of thermal expansion of about $32.5 \times 10^{-7}$/°C. over the range of 0°–300° C.

Windows for use in those stoves have also been prepared from 96% silica glass, e.g., VYCOR brand products marketed by Corning Glass Works. Such glasses deomonstrate strain points of about 829° C. and coefficients of thermal expansion of about $8 \times 10^{-7}$/°C. over the range of 0°–300° C. Those glasses have proven to be more satisfactory for stove windows than the borosilicate compositions for two reasons. First, they are essentially immune to cracking resulting from thermal causes at the temperatures encountered. Second, because they are essentially free from alkali metals and are substantially pure silica, they are very highly resistant to attack by the chemical components in the stove atmosphere. However, such glasses are considerably more expensive than borosilicate compositions and, in like manner to the borosilicate glasses, are subject to damage through impact and other physical abuse.

In an effort to provide a transparent window with improved mechanical properties, while exhibiting the necessary thermal shock resistance and refractoriness, transparent glass-ceramic compositions have been investigated. Transparent glass-ceramic articles are well-known to the art; the classic study thereof being "Tansparent Glass-Ceramics", G. H. Beall and D. A. Duke, *Journal of Materials Science*, 4, pages 340–352 (1969). Those authors explained that glass-ceramic products will be transparent to the eye when the crystals present therein are substantially smaller than the wavelength of visible light or the birefringence within the crystals and the refractive index difference between the crystals and the residual glass are very small. The writers discussed three general composition areas in the aluminosilicate glass-ceramic system wherein highly transparent articles can be produced, one of those areas being the $Li_2O$-$Al_2O_3$-$SiO_2$ field wherein β-quartz or β-eucryptite solid solution, as such as been variously termed, comprises the predominant crystal phase. U.S. Pat. Nos. 3,157,522, 3,241,985, 3,252,811, 3,282,712, 3,484,327, 3,499,773, and 3,788,865 are illustrative of specific composition areas within the $Li_2O$-$Al_2O_3$-$SiO_2$ system suitable for the preparation of such transparent products. Because of the inherent high crystallinity of glass-ceramic articles, the mechanical strengths exhibited thereby are customarily appreciably greater than glass bodies; for example, moduli of rupture twice that manifested by the present glass. β-quartz or β-eucryptite solid solution crystals can demonstrate coefficients of thermal expansion over the range of 0°–300° C. of 0 or less. Consequently, a highly crystalline glass-ceramic containing such crystals as the predominant crystal phase will exhibit excellent thermal shock resistance. Finally, such a glass-ceramic will display high refractoriness because of the high melting point of the crystals, coupled with the fact that the small proportion of residual glass is of a high aluminosilicate composition which has a high softening point.

U.S. Pat. No. 3,148,994 discloses glass-ceramic compositions containing fluoride as a mandatory constituent which are notable for their high mechanical strength. The exact mechanism through which fluoride imparts the improved strength to the bodies was not understood, but the presence of at least 0.1% and up to 1.2% by weight (0.2–0.5% optimum), as analyzed, was clearly shown to have a favorable effect upon the modulus of rupture of the final product. The base compositions described in that patent consisted essentially, expressed in terms of weight percent on the oxide basis, of

| | |
|---|---|
| $SiO_2$ | 65–75 |
| $Li_2O$ | 1–4 |
| $MgO$ | 1–4 |
| $Al_2O_3$ | 15–25 |
| $ZnO$ | 0.5–2.0 |
| $Na_2O$ and/or $K_2O$ | 0.1–2.0 |
| $TiO_2$ | 3–6 |
| F | 0.1–1.2 |

Where the precursor glass bodies having compositions within those ranges are crystallized in situ via heat treating at temperatures no higher than about 850° C., transparent glass-ceramic articles are produced wherein β-quartz solid solution constitutes the predominant crystal phase. A minor amount of rutile crystallization may also be present.

Windows for coal and wood stoves fabricated from glass-ceramic sheet having the following composition, as analyzed in weight precent, have been marketed by Corning Glass Works under Code 9618. The glass-ceramic is transparent and contains β-quartz solid solution as essentially the sole crystal phase present.

| | |
|---|---|
| $SiO_2$ | 67.4 |
| $Al_2O_3$ | 20.4 |
| $LiO_2O$ | 3.5 |
| $Na_2O$ | 0.2 |
| $K_2O$ | 0.2 |
| $ZnO$ | 1.2 |
| $MgO$ | 1.6 |

-continued

| | |
|---|---|
| TiO$_2$ | 4.8 |
| As$_2$O$_3$ | 0.4 |
| Fe$_2$O$_3$ | 0.03 |
| F | 0.2 |

The coefficient of thermal expansion (0°-300° C.) exhibited by the glass-ceramic is about $2.3 \times 10^{-7}/°C$.; hence, the material is very resistant to thermal shock.

However, experience had indicated that Code 9618 is subject to chemical attack after relatively short term exposure to the atmosphere of a coal or wood buring stove. Thus, the surface of the glass-ceramic becomes rough and crazing is developed therein.

U.S. Pat. No. 4,018,612 discloses glass-ceramic articles of very high transparency to visible light, excellent transmission to infrared radiation, and coefficients of thermal expansion (room temperature-600° C.) of less than 10. The articles contain $\beta$-quartz solid solution as the predominant crystal phase and are formed by exposing precursor glasses to heat treatments between about 850°-950° C., the precursor glasses consisting essentially, expressed in terms of weight percent on the oxide basis, of

| | |
|---|---|
| SiO$_2$ | 67-70 |
| Li$_2$O | 2.5-3.5 |
| MgO | 1.5-2.5 |
| Al$_2$O$_3$ | 17.75-20 |
| ZnO | 1-2 |
| TiO$_2$ | 2-4.5 |
| ZrO$_2$ | 1-2 |
| BaO | 0-2 |

Alkali metal oxides other than Li$_2$O, alkaline earth metal oxides other than MgO and BaO, and B$_2$O$_3$ are essentially absent from the composition. Whereas the compositions of U.S. Pat. No. 3,148,994 utilize TiO$_2$ alone as the nucleating agent, nucleation of the above glasses is promoted by a combination of TiO$_2$+ZrO$_2$.

Th products of U.S. Pat. No. 4,018,612 exhibit optical and mechanical characteristics strongly recommending their application as windows for coal and wood burning stoves. Unfortunately, however, they are also subject to chemical attack resulting from exposure to the fumes present in such stoves.

Accordingly, the primary objective of the instant invention is to provide a method for inhibiting the susceptibility of the glass-ceramics of U.S. Pat. No. 4,108,612 and of fluoride-containing glass-ceramic bodies of the type disclosed in U.S. Pat. No. 3,148,994 and exemplified by Code 9618 to attack by the atmospheres generated in coal and wood burning stoves.

SUMMARY OF THE INVENTION

Chemical analyses of the surfaces of crazed specimens of Code 9618 glass-ceramic and samples of glass-ceramics of the type described in U.S. Pat. No. 4,018,612 indicated a depletion of Li$_2$O content to a depth of about 50 microns. The makeup of the atmosphere present in a coal or wood burning stove is, of coruse, dependent upon the composition of the fuel being burned. Nevertheless, steam is always generated and SO$_2$ and/or SO$_3$ will very frequently be present.

It has long been recognized in the glass and glass-ceramic arts that hydrogen ions can replace lithium ions and U.S. Pat. No. 3,834,981 disclosed that a substantial reduction in volume occurs when a H+ for Li+ ion exchange conducted in hot H$_2$SO$_4$ takes place in $\beta$-spodumene solid solution crystals. It is believed that exposure of the glass-ceramic window to the hot atmosphere of the stove subjects it to a like reaction, viz., a H+ ion for Li+ ion exchange. Thus, the surface of the window undergoes a substantial reduction in volume which causes crazing and surface roughening to develop. Two methods for overcoming this problem have been devised involving a common fundamental mechanism but differing in detail.

The first and less satisfactory procedure contemplates subjecting the precursor glass article to an ion exchange reaction wherein H+ ions are substituted for Li+ ions in the glass surface, thereby reducing the Li+ ion concentration in the glass surface, and then firing the article to convert it into a glass-ceramic. As a result of this ion exchange, only the most tightly bonded Li$_2$O remains, forming a $\beta$-quartz solid solution crystallization which is much more resistant to the type of H+ ion for Li+ ion exchange taking place in the stoves.

The ion exchange reaction is conveniently carried out utilizing the practice described generally in U.S. Pat. No. 3,834,981. That is, the glass article is contacted with a strong mineral acid, e.g., H$_2$SO$_4$, HCl, or HNO$_3$ at temperatures between about 25°-320° C. for a sufficient length of time to replace lithium ions with hydrogen ions to a depth of at least 10 microns and preferably at least 25 microns in the surface of the glass.

Thereafter, the ion exchanged glass will be crystallized in situ by being subjected to the heat treatment proper for the composition of the glass. Desirably, the glass article will be heated relatively slowly, e.g., no more rapidly than about 200° C./hour, to the range of crystallization temperatures to insure the essentially complete, non-destructive removal of H$_2$O from the glass structure.

The H+ ion for Li+ ion exchange must be undertaken on the precursor glass. Hence, when the exchange reaction is carried out on the glass-ceramic, crazing and roughening of the surface thereof invariably occurs. U.S. Pat. No. 3,834,981 has no description of ion exchanges in glass or any mention of a glass-ceramic article containing $\beta$-quartz or $\beta$-eucryptite solid solution crystals.

In summary, this embodiment of the invention comprises four general steps:

I. a batch is melted for a glass selected from the group consisting essentially, expressed in terms of weight percent on the oxide basis, of

| | Group A | Group B |
|---|---|---|
| SiO$_2$ | 65-75 | 67-70 |
| Li$_2$O | 1-4 | 2.5-3.5 |
| MgO | 1-4 | 1.5-2.5 |
| Al$_2$O$_3$ | 15-25 | 17.75-20 |
| ZnO | 0.5-2.0 | 1-2 |
| Na$_2$O and/or K$_2$O | 0.1-2.0 | — |
| TiO$_2$ | 3-6 | 2-4.5 |
| F | 0.1-1.2 | — |
| ZrO$_2$ | — | 1-2 |
| BaO | — | 0-2 |

II. the melt is simultaneously cooled and shaped into a glass article of a desired configuration;

III. the glass article is contacted with a source of strong mineral acid at temperatures between about 25°-320° C. for a sufficient length of time to cause the replacement of Li$^{30}$ ions in the glass surface with H+ ions to a depth of at least 10 microns; and thereafter IV. the glass article is heated at a rate not exceeding about 200° C./hour to a temperature selected from the group of 750°–850° C. for a glass having a composition within Group A above and 850°–950° C. for a glass having a composition within Group B above for a sufficient length of time to crystallize the glass article in situ to a glass-ceramic article containing β-quartz solid solution as the predominant crystal phase.

As can be appreciated, extended exposure of the glass-ceramic article, produced in accordance with this embodiment of the invention will eventually result in the development of crazing due to penetration and migration of the H+ ions from the fumes in the stove atmosphere into the surface of the glass-ceramic. Consequently, to provide significant protection, the precursor glass will be exposed to the H+ ion for Li+ ion exchange reaction for the period of time required to produce a layer of depleted Li+ ion concentration to a depth of at least 10 microns and, preferably, at least 25 microns. In general, windows fabricated according to the above-described procedure exhibit about a four-fold improvement in resistance to crazing from attack by the atmospheres of coal and wood stoves, when compared with windows of identical compositions, but prepared in the conventional manner.

The second and more preferred embodiment of the inventive method contemplates forming a glass-ceramic article containing β-quartz solid solution as the predominant crystal phase from one of the above-cited ranges of composition, and thereafter subjecting the article to an ion exchange reaction wherein K+ ions are substituted for Li+ ions in the surface of the article, thereby decreasing the Li+ ion concentration with a concomitant increase on a molar basis in K+ ion concentration. This replacement reaction accomplishes two purposes: first, not only does it reduce the Li+ ion concentration available for exchange with H+ ions from the stove atmosphere; but also, second, the presence of the large K+ ions serves to block the penetration and migration of H+ ions into the article when exposed to stove atmospheres.

The exchange of K+ ions for Li+ ions in glass-ceramic articles containing β-spodumene solid solution as the predominant crystal phase to enhance the mechanical strength of the articles is described in U.S. Pat. No. 4,074,993. That patent discloses contacting the glass-ceramic article with a source of K+ ions (normally a bath of a molten potassium salt) at temperatures between 550°–800° C. for a sufficient length of time to cause the replacement of Li+ ions from the β-spodumene solid solution crystals in the surface of the article with K+ ions to a depth preferably of at least 0.001" (~25 microns). The patent notes the utility of a bath of molten KNO$_3$ up to temperatures approaching 600° C. and a bath consisting of, by weight, 52% KCl and 48% K$_2$SO$_4$ (the eutectic of those two compounds) as useful to temperatures up to 800° C. However, the patent makes no reference to the problem of surface crazing resulting from the exchange of H+ ions for Li+ ions, so quite obviously there is no indication that the K+ ion for Li+ ion exchange reaction will alleviate that problem. Moreover, the only mention of β-eucryptite solid solution crystals in the context of an ion exchange reaction is the observation that glass-ceramic articles containing such crystals as the predominant crystal phase do not strengthen when subjected to the K+ ion for Li+ ion exchange.

This embodiment of the present invention also comprises four general steps:

I. a batch is melted for a glass selected from the group consisting essentially, expressed in terms of weight percent on the oxide basis, of

|  | Group A | Group B |
| --- | --- | --- |
| SiO$_2$ | 65–75 | 67–70 |
| Li$_2$O | 1–4 | 2.5–3.5 |
| MgO | 1–4 | 1.5–2.5 |
| Al$_2$O$_3$ | 15–25 | 17.75–20 |
| ZnO | 0.5–2.0 | 1–2 |
| Na$_2$O and/or K$_2$O | 0.1–2.0 | — |
| TiO$_2$ | 3–6 | 2–4.5 |
| F | 0.1–1.2 | — |
| ZrO$_2$ | — | 1–2 |
| BaO | — | 0–3 |

II. The melt is simultaneously cooled to a temperature at least below the transformation range thereof and shaped into a glass article of a desired configuration;

III. The glass article is heated to a temperature selected from the group of 750°–850° C. for a glass having a composition within Group A above and 850°–950° C. for a glass having a composition within Group B above for a sufficient length of time to crystallize the glass article in situ to a glass-ceramic article containing β-quartz solid solution as the perdominant crystal phase; and thereafter IV. the glass-ceramic article is contacted with a source of potassium ions at a temperature between 400°–800° C. for a sufficient length of time to cause the replacement of Li+ ions in the β-quartz solid solution crystals in the surface of the article with K+ ions to a depth of at least 10 microns and, preferably, at least 25 microns.

In general, windows fabricated in accordance with this embodiment of the invention demonstrate an improvement in resistance to crazing from exposure to the atmospheres of coal and wood stoves of about an order of magnitude when compared with windows of identical composition but produced in the conventional manner.

A bath of molten KNO$_3$ provides a convenient source of K+ ions over the temperature range of about 400°–600° C., whereas a bath of the eutectic 52% by weight KCl and 48% by weight K$_2$SO$_4$ is an operable source of K+ ions over the range of about 700°–800° C.

The K+ ion for Li+ ion exchange reaction must be undertaken on the glass-ceramic article, not on the precursor glass body. Hence, when a K+ ion for Li+ ion exchange is carried out on the parent glass body, surface crazing and roughening invariably occur when the glass body is subsequently crystallized in situ.

Furthermore, whereas the utility of a Na+ ion for Li+ ion exchange with Li+-containing glasses and with glass-ceramics containing β-spodumene solid solution as the predominant crystal phase to enhance the mechanical strength of such articles is well known, that exchange is not operable in the inventive method. Thus, whether that exchange is conducted on the precursor glass article which is thereafter crystallized in situ, or carried out on the β-quartz-containing glass-ceramic article, surface crazing invariably occurs.

Finally, as is well known to workers in the glass-ceramic art, the crystallization in situ practice may involve a multi-step heat treatment. For example, the parent glass article may initially be heated to a temperature in or slightly above the transformation range to induce nucleation. Thereafter, the nucleated article is heated to a higher temperature to cause the growth of crystals on the nuclei. Such practice frequently results in more uniformly fine-grained crystallization. Accordingly, whereas not required, a multi-step heat treatment is often preferred.

Related Applications

Ser. No. 451,283 filed concurrently herewith by me under the title *Transparent Colorless Glass-Ceramics Especially Suitable for Use as Stove Windows.*

Ser. No. 451,284 filed concurrently herewith by me under the title *Colored Transparent, Translucent, and Opaque Glass-Ceramics.*

DESCRIPTION OF PREFERRED EMBODIMENTS

The following table records a group of exemplary compositions, analyzed in terms of parts by weight on the oxide basis, suitable for illustrating the method of the invention. The actual ingredients making up the starting batch may constitute any materials, either the oxides or other compounds, which, when melted together, will be converted into the desired oxide in the proper proportions. Because it is not known with which cation(s) the fluoride is combined and because the content thereof is small, it is merely reported as fluoride.

The batch ingredients were compounded, ballmilled together to aid in obtaining a homogeneous melt, charged into platinum crucibles, lids placed upon the crucibles, and the crucibles introduced into a furnace operating at about 1550°–1600° C. The batches were melted for about 16 hours with stirring, canes having a diameter of about 0.25" were hand-drawn from each melt and the remainder of each melt poured into a steel mold to form a glass slab having dimensions of about 6"×6"×0.5". The slabs were immediately transferred to an annealer operating at about 650°–700° C. After annealing, the slabs were cut, ground, and polished to yield squares with dimensions of about 2.5"×2.5"×0.2".

$As_2O_3$ performs its conventional function as a fining agent and $Fe_2O_3$ is merely present as an impurity in the batch materials.

TABLE

| | 1 | 2 |
|---|---|---|
| $SiO_2$ | 67.4 | 68.5 |
| $Al_2O_3$ | 20.4 | 19.0 |
| $Li_2O$ | 3.5 | 2.8 |
| $Na_2O$ | 0.2 | 0.2 |
| $K_2O$ | 0.2 | 0.1 |
| ZnO | 1.2 | 1.2 |
| BaO | — | 0.9 |
| MgO | 1.6 | 2.2 |
| $TiO_2$ | 4.8 | 2.9 |
| $ZrO_2$ | — | 1.5 |
| F | 0.2 | — |
| $As_2O_3$ | 0.4 | 0.7 |
| $Fe_2O_3$ | 0.03 | 0.028 |

In order to provide an accelerated procedure for evaluating the resistance to crazing which various bodies would exhibit to the atmospheres encountered in coal and wood burning stoves, a laboratory oven was fabricated wherein the temperature and internal atmosphere could be carefully controlled. An atmosphere consisting of air, $H_2O$, CO, $CO_2$, S, $SO_2$, $SO_3$, and $H_2SO_4$ was continuously moved through the oven to simulate the movement of gases in a stove and the oven was operated in the range of 200°–600° C., as measured at various positions on the oven walls. The above-described glass squares with or without treatments were subjected to that environment for periods of time to determine their resistance. A residence time of ~100 hours in the laboratory oven has been deemed to simulate about one year of actual service as a stove window.

Squares of Example 1 were crystallized in situ by heating at a rate of about 100° C./hour to 750° C., holding at that temperature for about one hour to induce nucleation, raising the temperature at about 100° C./hour to 825° C., maintaining that temperature for about two hours to cause the growth of crystals on the nuclei, and then cooling to room temperature furnace rate. X-ray diffraction analyses identified β-quartz solid solution as the predominant crystal phase accompanied with a minor amount of rutile.

Squares of Example 2 were crystallized in situ by heating at a rate of about 100° C./hour to 780° C., holding at that temperature for about one hour to induce nucleation, raising the temperature at a rate of about 100° C./hour to 900° C., maintaining that temperature for about one hour to grow crystals on the nuclei, and then cooling to room temperature at furnace rate. X-ray diffraction analyses identified β-quartz solid solution to be the predominant crystal phase with a very minor amount of rutile.

Both of those materials exhibited incipient crazing after six hours in the laboratory oven and were so significantly crazed with accompanying surface roughening after 24 hours as to be considered unusable.

Crystallized squares of each composition were immersed into an aqueous bath of concentrated $H_2SO_4$ operating at about 270° C. The squares demonstrated incipient crazing within a very brief period. Other crystallized squares were immersed into an aqueous bath of 10% $H_2SO_4$ operating at about 95° C. Again, the squares exhibited crazing and surface roughening before Li+ ions had been removed to any practical depth in the surface of the squares.

Crystallized squares of each composition were immersed into a bath of molten $NaNO_3$ operating at about 330° C. The squares began to display crazing within a very brief time.

Crystallized squares of each composition were immersed into a bath of molten $KNO_3$ operating at about 530° C. Essentially no crazing or surface roughening was observed and, after an immersion of 24 hours, the squares were heated in the laboratory oven for 1000 hours. Virtually no crazing could be discerned.

Because it is recognized that the exchange of K+ ions for Li+ ions will take place more rapidly as the temperature of the reaction is raised, crystallized squares of each composition were immersed into a bath of molten salt consisting of 52% by weight KCl and 48% by weight $K_2SO_4$ operating at about 700° C. Again, essentially no crazing was seen and, after an immersion of only one hour, the squares resisted crazing and surface roughening when heated in the laboratory oven for 800 hours. Such resistance is believed to be sufficient for a commercial stove window but, if desired, a somewhat longer immersion may be utilized to impart still improved resistance to crazing and surface roughening.

Squares of the precursor glass of each composition were immersed into a bath of concentrated $H_2SO_4$ operating at about 270° C. After about eight hours the squares were removed from the bath, rinsed in tap water to eliminate any adhering H$_2$SO$_4$, and dried. Essentially no crazing was discerned on the squares. Thereafter, the squares were crystallized in situ employing the heat treating schedules recited above. The crystallized squares resisted crazing when exposed to the atmosphere of the laboratory oven for 100 hours. Such resistance is a significant improvement over the untreated products but is far removed from the resistance conferred upon the articles through the K+ ion for Li+ ion exchange.

Squares of the precursor glass of each composition were immersed into a bath of molten KNO$_3$ operating at about 530° C. After about 24 hours the squares were removed from the bath, rinsed in tap water to eliminate any adhering KNO$_3$, and dried. Essentially no crazing or surface roughening was noted on the surface of the squares. Thereafter, the squares were crystallized in situ utilizing the heat treating schedules described above. Each sample evidenced substantial crazing and surface roughening.

When squares of the precursor glass of each composition were immersed into a bath of molten NaNO$_3$ operating at about 330° C., maintained therein for about 24 hours, removed from the bath, rinsed, and dried, essentially no crazing or surface roughening was observed. Nevertheless, upon crystallizing the squares in accordance with the heat treating schedules reported above, each displayed significant crazing and surface roughening.

In summary, the above examples illustrate that a surface barrier layer relatively impervious to a H+ ion for Li+ ion exchange can be developed in transparent glass-ceramic articles containing β-quartz solid solution as the predominant crystal phase and having base compositions within the ranges disclosed in U.S. Pat. No. 3,148,994 and U.S. Pat. No. 4,108,612. However, the inventive embodiment founded upon the K+ ion for the Li+ ion exchange in the crystallized glass-ceramic is much preferred because the resistance to crazing developed thereby is about an order of magnitude greater than that provided by the H+ ions for Li+ ion exchange conducted in the pecursor glass body followed by crystallizing the glass to a glass-ceramic.

I claim:

1. A method for making a window or other component for a coal or wood burning stove, which window or other component is exposed to the atmosphere generated by the combustion of wood or coal in said stove, said window or other component being made from a transparent glass-ceramic body containing β-quartz solid solution as the predominant crystal phase, which method comprises the steps of:

(a) melting a batch for a glass selected from the group consisting, expressed in terms of weight percent on the oxide basis, of

|  | Group A | Group B |
| --- | --- | --- |
| SiO$_2$ | 65–75 | 67–70 |
| Li$_2$O | 1–4 | 2.5–3.5 |
| MgO | 1–4 | 1.5–3.5 |
| Al$_2$O$_3$ | 15–25 | 17.75–20 |
| ZnO | 0.5–2.0 | 1–2 |
| Na$_2$O and/or K$_2$O | 0.1–2.0 | — |
| TiO$_2$ | 3–6 | 2–4.5 |
| F | 0.1–1.2 | — |
| ZrO$_2$ | — | 1–2 |
| BaO | — | 0–2 | with alkali metal oxides other than Li$_2$O, alkaline earth metal oxides other than MgO and BaO, and B$_2$O$_3$ being essentially absent from the Group B compositions;

(b) cooling said melt to a temperature below the transformation range thereof and simultaneously shaping a glass body of a desired configuration therefrom;

(c) heating said glass body to a temperature selected from the group of 750°–850° C. for a glass having a composition within Group A and 850°–950° C. for a glass having a composition within Group B for a sufficient length of time to crystallize the glass article in situ to a glass-ceramic article containing β-quartz solid solution as the predominant crystal phase;

(d) contacting said glass-ceramic body with a source of potassium ions at a temperature between 400°–800° C. for a sufficient length of time to cause the replacement of Li+ ions in the β-quartz solid solution crystals in the surface of the article with K+ ions to a depth of at least 10 microns to thereby provide a transparent body which is resistant to attack from the atmosphere containing steam, SO$_2$, and/or SO$_3$ generated in a coal or wood burning stove; and pl (e) exposing said transparent body to said atmosphere generated by said combustion of wood or coal.

2. A method according to claim 1 wherein said source of potassium ions is a bath of molten salt consisting of 52% by weight KCl and 48% by weight K$_2$SO$_4$ operating at about 700°–800° C.

3. A method according to claim 1 wherein said source of potassium is a bath of molten KNO$_3$ operating at about 400°–600° C.

4. A method according to claim 1 wherein the K+ ions replace Li+ ions to a depth of at least 25 microns.

* * * * *